(12) United States Patent
Sung (10) Patent No.: US 11,711,566 B2
(45) Date of Patent: Jul. 25, 2023

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventor: Jihoon Sung, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/847,551

(22) Filed: Jun. 23, 2022

(65) Prior Publication Data
US 2022/0417583 A1    Dec. 29, 2022

(30) Foreign Application Priority Data
Jun. 28, 2021 (KR) .................. 10-2021-0084046

(51) Int. Cl.
*H04N 21/414* (2011.01)
*H04N 21/61* (2011.01)

(52) U.S. Cl.
CPC ... *H04N 21/41422* (2013.01); *H04N 21/6193* (2013.01)

(58) Field of Classification Search
CPC .................. H04N 21/41422; H04N 21/6193
See application file for complete search history.

(56) References Cited

U.S. PATENT DOCUMENTS

2009/0150967 A1* 6/2009 Chen .................. H04H 20/26
725/153
2010/0220818 A1* 9/2010 Yamamoto ....... H04N 21/42202
375/340

\* cited by examiner

*Primary Examiner* — Mulugeta Mengesha
(74) *Attorney, Agent, or Firm* — Morgan, Lewis & Bockius LLP

(57) ABSTRACT

A vehicle includes a plurality of broadcast reception antennae; a speaker; and an audio-video-navigation (AVN) device electrically connected to the plurality of broadcast reception antennae and the speaker; wherein the AVN device is configured to receive broadcast signals of a plurality of different frequencies from the plurality of broadcast reception antennae, synthesize the broadcast signals of different frequencies, and provide the synthesized broadcast signal to the speaker to output a sound corresponding to the synthesized broadcast signals.

18 Claims, 7 Drawing Sheets

VEHICLE AND METHOD OF CONTROLLING THE SAME

CROSS-REFERENCE TO RELATED APPLICATION(S)

The present application claims priority to Korean Patent Application No. 10-2021-0084046, filed on Jun. 28, 2021, the entire contents of which is incorporated herein for all purposes by this reference.

BACKGROUND OF THE PRESENT DISCLOSURE

Field of the Present Disclosure

The present disclosure relates to a vehicle and a method of controlling the same, and more particularly, to a vehicle including a global satellite navigation system (GSNS) and a broadcast reception system (BRS) and a method of controlling the same.

Description of Related Art

In general, a vehicle refers to a means of transportation that runs on a road or track using fossil fuels, electricity, etc. as a power source.

Vehicles not only serves as simply a means of transportation, but also serves as a living space that provides relaxation to drivers. Furthermore, to provide comfort and rest to drivers, various audio systems and video systems for a vehicle are provided in the vehicle.

In many cases, a driver listens to an audio broadcast using an audio system.

However, there are cases in which a frequency of broadcast signals is different for each region even for broadcasting by the same broadcasting station. In other words, broadcast signals including the same broadcast content may be transmitted at different frequencies for each region.

In the case of the frequency of broadcast signals of a broadcasting station being changed while a vehicle is traveling, a reception of the broadcast signals may be stopped. Accordingly, a user needs to directly change a reception frequency of audio systems to the frequency of the broadcast signals in the changed region, leading to cause the user's inconvenience.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present disclosure are directed to providing a vehicle capable of automatically changing a reception frequency depending on the location of the vehicle and a method of controlling the same.

Another aspect of the present disclosure is to provide a vehicle for receiving a plurality of broadcast signals having same broadcast content depending on the location of the vehicle, and a method of controlling the same.

Additional aspects of the present disclosure will be set forth in part in the description which follows, and in part, will be obvious from the description, or may be learned by practice of the present disclosure.

According to an aspect of the present disclosure, a vehicle includes a plurality of broadcast reception antennae; a speaker; and an audio-video-navigation (AVN) device electrically connected to the plurality of broadcast reception antennae and the speaker; wherein the AVN device is configured to receive broadcast signals of a plurality of different frequencies from the plurality of broadcast reception antennae, synthesize the broadcast signals of the plurality of different frequencies, and provide the synthesized broadcast signal to the speaker to output a sound corresponding to the synthesized broadcast signals.

The vehicle may further include a GNSS antenna, wherein the AVN device may be connect electrically to the GNSS antenna, and the AVN device may be configured to identify a location of the vehicle based on a signal received through the GNSS antenna, process at least one of the broadcast signals of the plurality of different frequencies based on the location of the vehicle, and provide the processed broadcast signal to the speaker.

The AVN device may be configured to process a first broadcast signal of a first frequency among the broadcast signals of the plurality of different frequencies based on the vehicle being located in a first region, and process a second broadcast signal of a second frequency among the broadcast signals of the plurality of different frequencies based on the vehicle being located in a second region.

The AVN device may be configured to synthesize the first broadcast signal of the first frequency and the second broadcast signal of the second frequency based on the vehicle being located in a third region of the boundary between the first region and the second region.

The AVN device may be configured to shift the frequency of the first broadcast signal to an intermediate frequency (IF), shift the frequency of the second broadcast signal to the IF, and synthesize the first broadcast signal of the IF and the second broadcast signal of the IF.

The AVN device may be configured to delay a phase of at least one of the first broadcast signal and the second broadcast signal based on a difference between a phase of the first broadcast signal of the IF and a phase of the second broadcast signal of the IF.

The AVN device may be configured to shift the frequency of the first broadcast signal to the IF by synthesizing a first reference signal and the first broadcast signal, and shift the frequency of the second broadcast signal to the IF by synthesizing a second reference signal and the second broadcast signal.

The AVN device may be configured to identify a frequency of the second reference signal based on a frequency of the first reference signal, the first frequency, and the second frequency.

According to another aspect of the present disclosure, a method of controlling a vehicle, the method including the steps of receiving a plurality of broadcast signals of a plurality of different frequencies from a plurality of broadcast reception antennae of the vehicle; synthesizing the broadcast signals of the plurality of different frequencies; and outputting a sound corresponding to the synthesized broadcast signals.

The method may further including the identifying a location of the vehicle based on a signal received through a GNSS antenna of the vehicle, and processing at least one of the broadcast signals of the plurality of different frequencies based on the location of the vehicle.

The processing may include processing a first broadcast signal of a first frequency among the broadcast signals of the plurality of different frequencies based on the vehicle being located in a first region, and processing a second broadcast signal of a second frequency among the broadcast signals of the plurality of different frequencies based on the vehicle being located in a second region.

The processing may include synthesizing the first broadcast signal of the first frequency and the second broadcast signal of the second frequency based on the vehicle being located in a third region of the boundary between the first region and the second region.

The synthesizing may include shifting the frequency of the first broadcast signal to an intermediate frequency (IF), shifting the frequency of the second broadcast signal to the IF, and synthesizing the first broadcast signal of the IF and the second broadcast signal of the IF.

The synthesizing of the first and second broadcast signals of the IF may include delaying a phase of at least one of the first broadcast signal and the second broadcast signal based on a difference between a phase of the first broadcast signal of the IF and a phase of the second broadcast signal of the IF.

The shifting of the frequency of the first broadcast signal to the IF may include synthesizing a first reference signal and the first broadcast signal, and the shifting of the frequency of the second broadcast signal to the IF includes synthesizing a second reference signal and the second broadcast signal.

The frequency of the second reference signal may be based on a frequency of the first reference signal, the first frequency, and the second frequency.

According to another aspect of the present disclosure, an AVN device provided in a vehicle, the AVN device includes a broadcast receiver configured to obtain a plurality of broadcast signals of different frequencies from a plurality of broadcast reception antennae of the vehicle; and a processor configured to synthesize the broadcast signals of the plurality of different frequencies and provide a speaker of the vehicle to output a sound corresponding to the synthesized broadcast signals.

The AVN device may further include a GNSS receiver configured to identify a location of the vehicle based on a signal received through a GNSS antenna of the vehicle, wherein the processor is configured to process at least one of the broadcast signals of the plurality of different frequencies based on the location of the vehicle, and provide the processed broadcast signal to the speaker.

The processor may be configured to process a first broadcast signal of a first frequency among the broadcast signals of the plurality of different frequencies based on the vehicle being located in a first region, and process a second broadcast signal of a second frequency among the broadcast signals of the plurality of different frequencies based on the vehicle being located in a second region.

The processor may be configured to synthesize the first broadcast signal of the first frequency and the second broadcast signal of the second frequency, based on the vehicle being located in a third region of the boundary between the first region and the second region.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. Furthermore, respective descriptions of well-known functions and constructions may be omitted for increased clarity and conciseness.

Additionally, various exemplary embodiments will now be described more fully hereinafter with reference to the accompanying drawings. The exemplary embodiments may, however, be embodied in many different forms and should not be construed as being limited to the embodiments set forth herein. These embodiments are provided so that the present disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it may be directly connected or coupled to the other element or intervening elements may be present. In contrast, when an element is referred to as being "directly connected," or "directly coupled," to another element, there are no intervening elements present.

The terminology used herein is for describing various exemplary embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, working principles and embodiments of the present disclosure will be described with reference to the accompanying drawings.

Figure 1:
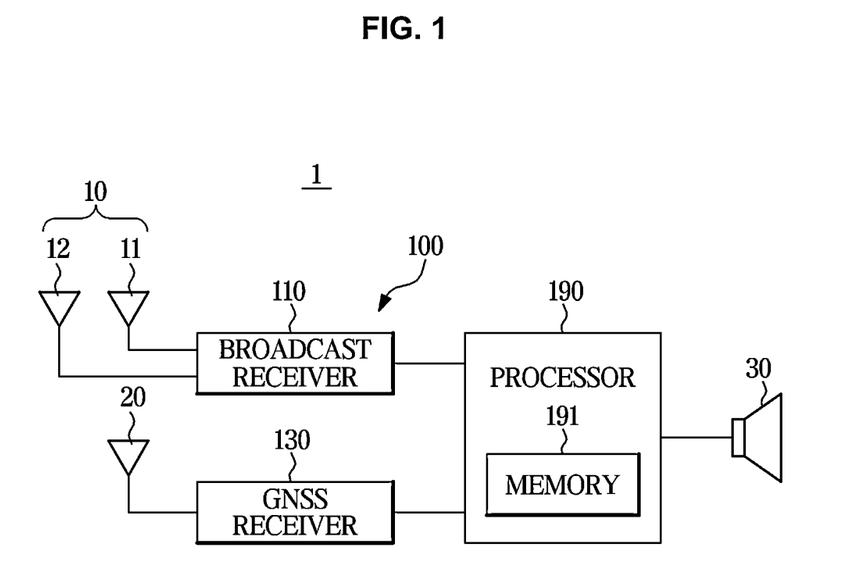
FIG. 1 is a view exemplarily illustrating a configuration of a vehicle according to an exemplary embodiment of the present disclosure.

FIG. 1 is a view exemplarily illustrating a configuration of a vehicle according to an exemplary embodiment of the present disclosure.

Referring to FIG. 1, a vehicle 1 may include an audio/video/navigation (AVN) device 100 and/or antenna devices 10 and 20.

The AVN device 100 may be a device in which an audio device, a display device, and a navigation device are integrated. However, the present disclosure is not limited thereto, and depending on the vehicle, the audio device, the display device, and the navigation device may be provided separately. If the audio device, the display device, and the navigation device are separated, the audio device, the display device, and the navigation device may communicate with each other via a communication network for a vehicle. The audio device, the display device, and the navigation device that communicate with each other may integrally provide a function of the AVN device 100.

The AVN device 100 may provide a variety of information and entertainment to a driver through sound. For example, the AVN device 100 may play an audio file stored in an internal storage medium or an external storage medium in response to a driver's instruction, and output a sound included in the played audio file. The AVN device 100 may receive sound data from a user device such as a portable computer, a portable communication device, and a portable media player, and the like, and may output a sound corresponding to the received sound data. Furthermore, the AVN device 100 may receive an audio broadcast signal and output a sound corresponding to the received audio broadcast signal.

The AVN device 100 may provide various information and entertainment to the driver through sound. For example, the AVN device 100 may play a video file stored in an internal storage medium or an external storage medium (e.g., compact disk (CD), universal serial bus (USB) storage medium, etc.) in response to a driver's instruction, and display an image included in the played video file. Furthermore, the AVN device 100 may receive a video broadcast signal and display an image included in the video broadcast.

Furthermore, the AVN device 100 may generate a route to a destination input by the driver's input, and display the generated route. For example, the AVN device 100 may receive a global navigation satellite system (GNSS) signal through the GNSS and identify the location of the vehicle 1 based on the GNSS signal. The AVN device 100 may generate the route to the destination based on a location (coordinate) of the destination input by the driver and a current location (coordinate) of the vehicle 1.

The antenna devices 10 and 20 may include a broadcast reception antenna 10 configured for receiving a radio broadcast signal (or a television broadcast signal) and a GNSS reception antenna 20 configured for receiving a GNSS signal.

The broadcast reception antenna 10 may have a dimension for receiving a signal in a frequency band (e.g., hundreds of kHz to thousands kHz bands and tens of MHz to hundreds of MHz bands) of radio broadcasting.

The broadcast reception antenna 10 may include a plurality of reception antennae 11 and 12. For example, the broadcast reception antenna 10 may include a first reception antenna 11 and a second reception antenna 12. The first and second reception antennae 11 and 12 may provide diversity for preventing deterioration of, for example, transmission quality of the broadcast signal. Furthermore, the first reception antenna 11 may receive the broadcast signal of a broadcast that the user is currently listening to, and the second reception antenna 12 may scan all receivable broadcast signals. The first and second reception antennae 11 and 12 may receive the broadcast signal of the same frequency or the broadcast signal of different frequencies.

The GNSS reception antenna 20 may have the dimension for receiving the signal in the frequency band of a GNSS satellite signal (e.g., 1575.42 MHz or 1227.60 MHz, etc.).

The broadcast reception antenna 10 and the GNSS reception antenna 20 may provide the broadcast signal and the GNSS signal to the AVN device 100, respectively.

The AVN device 100 may include a GNSS receiver 130 electrically connected to the GNSS reception antenna 20, or a broadcast receiver 110 electrically connected to the broadcast reception antenna 10, or a processor 190 electrically connected to the GNSS receiver 130 and/or the broadcast reception antenna 10.

Furthermore, the vehicle 1 may be provided with a speaker 30 electrically connected to the processor 190. The speaker 30 may convert an electrical signal provided from the processor 190 into sound.

The GNSS receiver 130 may obtain the GNSS signal from the GNSS reception antenna 20. The GNSS receiver 130 may process the GNSS signal and identify the position of the vehicle 1 based on the processing of the GNSS signal. The GNSS receiver 130 may provide information on the location of the vehicle 1 to the processor 190.

The broadcast receiver 110 may obtain the broadcast signal from the broadcast reception antenna 10. The broadcast receiver 110 may shift the frequency of the broadcast signal to an intermediate frequency and convert the broadcast signal of the intermediate frequency into a digital broadcast signal. The broadcast receiver 110 may provide the digital broadcast signal to the processor 190.

The broadcast receiver 110 may include a plurality of processing paths for processing the broadcast signal. For example, the broadcast receiver 110 may include a first reception path and a second reception path. The first reception path may process a first broadcast signal received through the first reception antenna 11 and provide the processed first broadcast signal to the processor 190. Furthermore, the second reception path may process a second broadcast signal received through the second reception antenna 12 and provide the processed second broadcast signal to the processor 190.

The processor 190 may include a memory 191 for storing or memorizing a program (a plurality of instructions) or data for processing a signal. The memory 191 may include, for example, a volatile memory such as a static random access memory (S-RAM), a dynamic random access memory (D-RAM), and the like, and a non-volatile memory such as a read only memory (ROM) and an erasable programmable read only memory (EPROM), and the like. The memory 191 may be provided integrally with the processor 190 or as a semiconductor device separated from the processor 190. Furthermore, an external memory may be additionally provided outside the processor 190.

Furthermore, the processor 190 may include a processing core (e.g., an arithmetic circuit, a memory circuit, and a control circuit) that processes a signal based on program or data stored in the memory 191 and outputs a control signal.

The processor 190 may obtain information on the location of the vehicle 1 from the GNSS receiver 130 and identify the location of the vehicle 1 based on the location information.

The processor 190 may obtain the broadcast signal from the broadcast receiver 110 and process the broadcast signal. The processor 190 may convert the processed broadcast signal into an analog electrical signal and then provide the analog electrical signal to the speaker 30. The speaker 30 may convert the analog electrical signal into sound and output the converted sound.

The processor 190 may process the broadcast signal obtained from the first reception path and/or the second reception path based on the location of the vehicle 1. For example, the processor 190 synthesizes the first broadcast signal obtained from the first reception path and the second broadcast signal obtained from the second reception path based on the vehicle 1 being located within a predetermined region, and then may process the synthesized broadcast signals. Furthermore, the processor 190 may process the broadcast signal obtained from any one of the first and second reception paths of the broadcast receiver 110 based on the vehicle 1 being out of the predetermined region.

Figure 2:
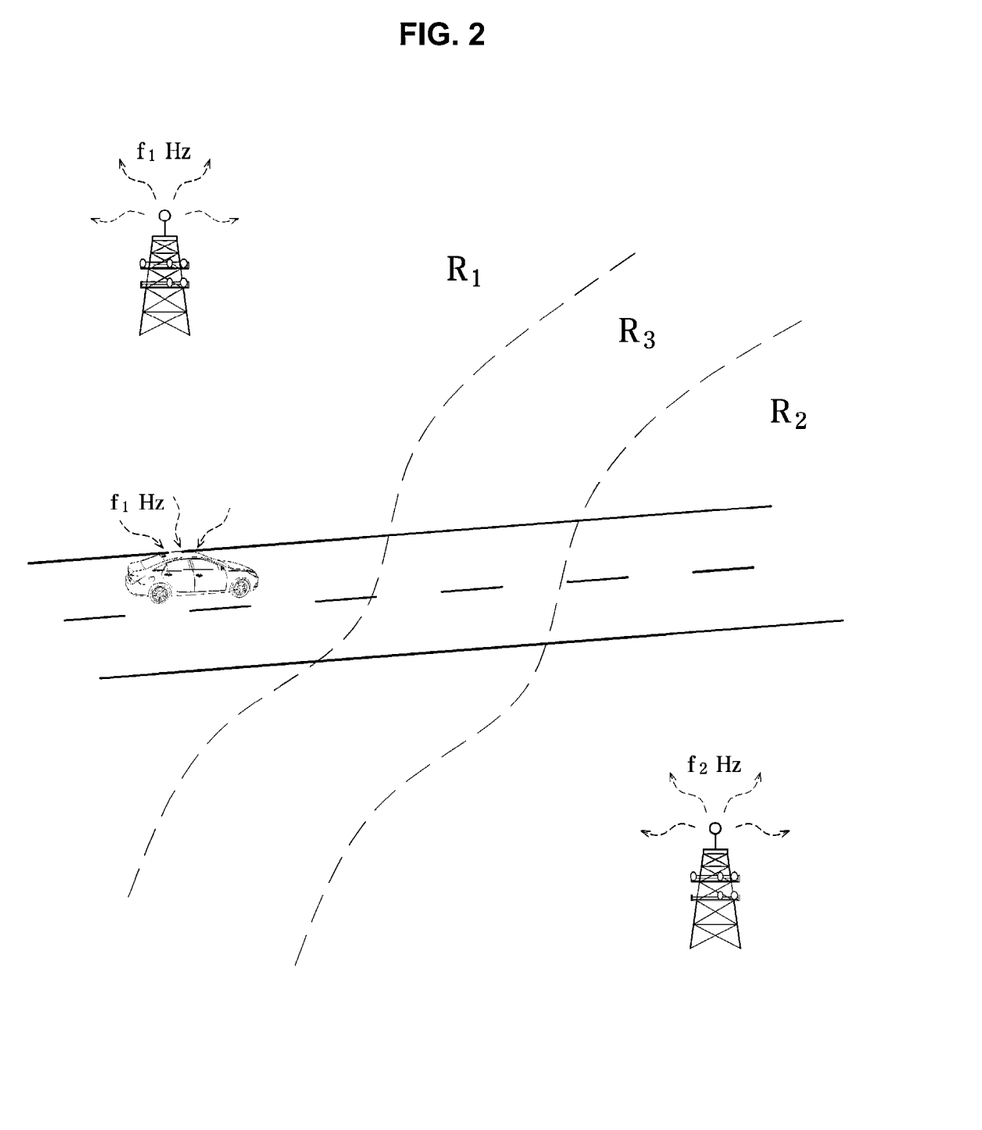
FIG. 2 is a view exemplarily illustrating a vehicle receiving broadcast signals according to an exemplary embodiment of the present disclosure.
Figure 3:
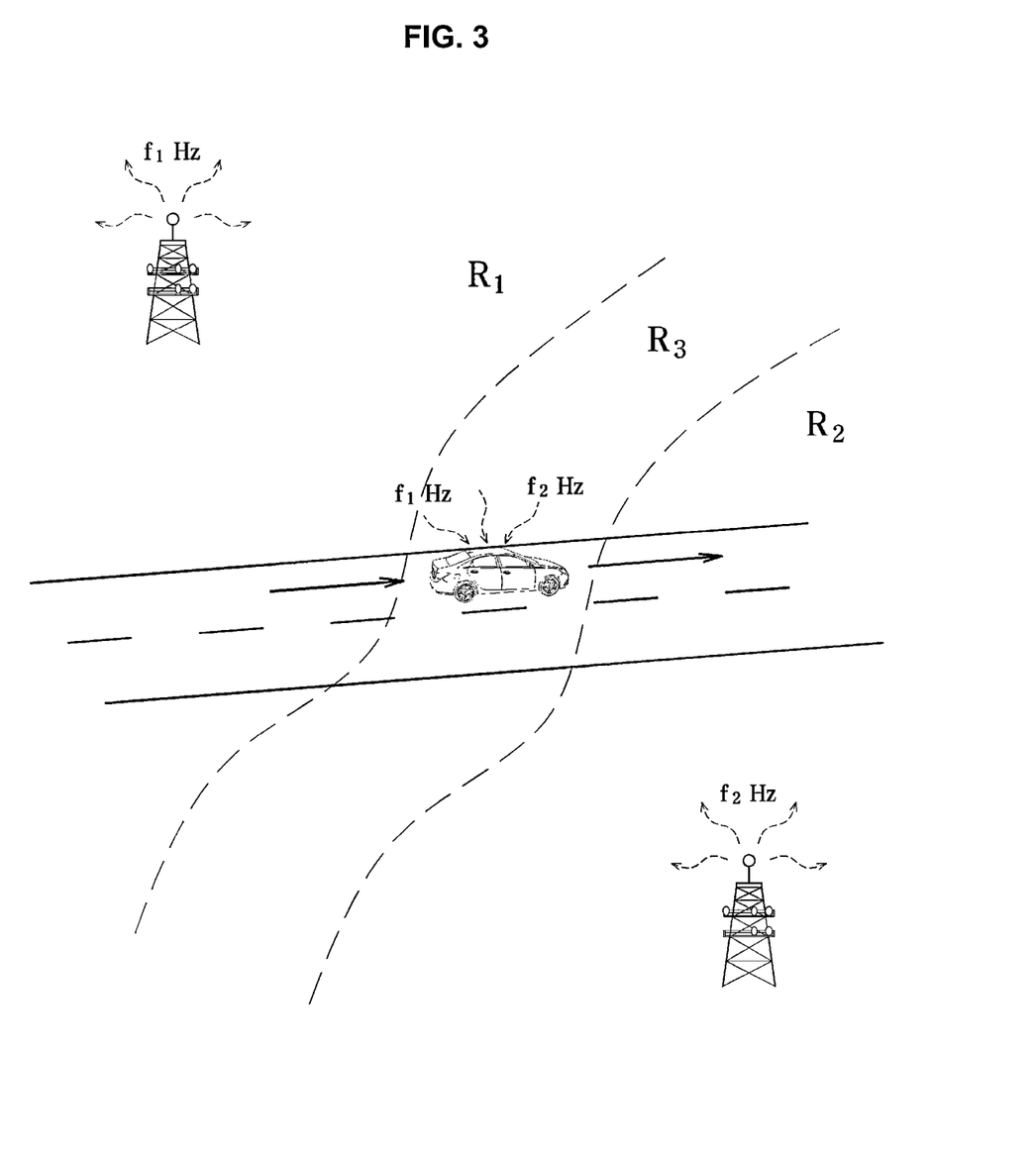
FIG. 3 is a view exemplarily illustrating a vehicle receiving broadcast signals according to another exemplary embodiment of the present disclosure.
Figure 4:
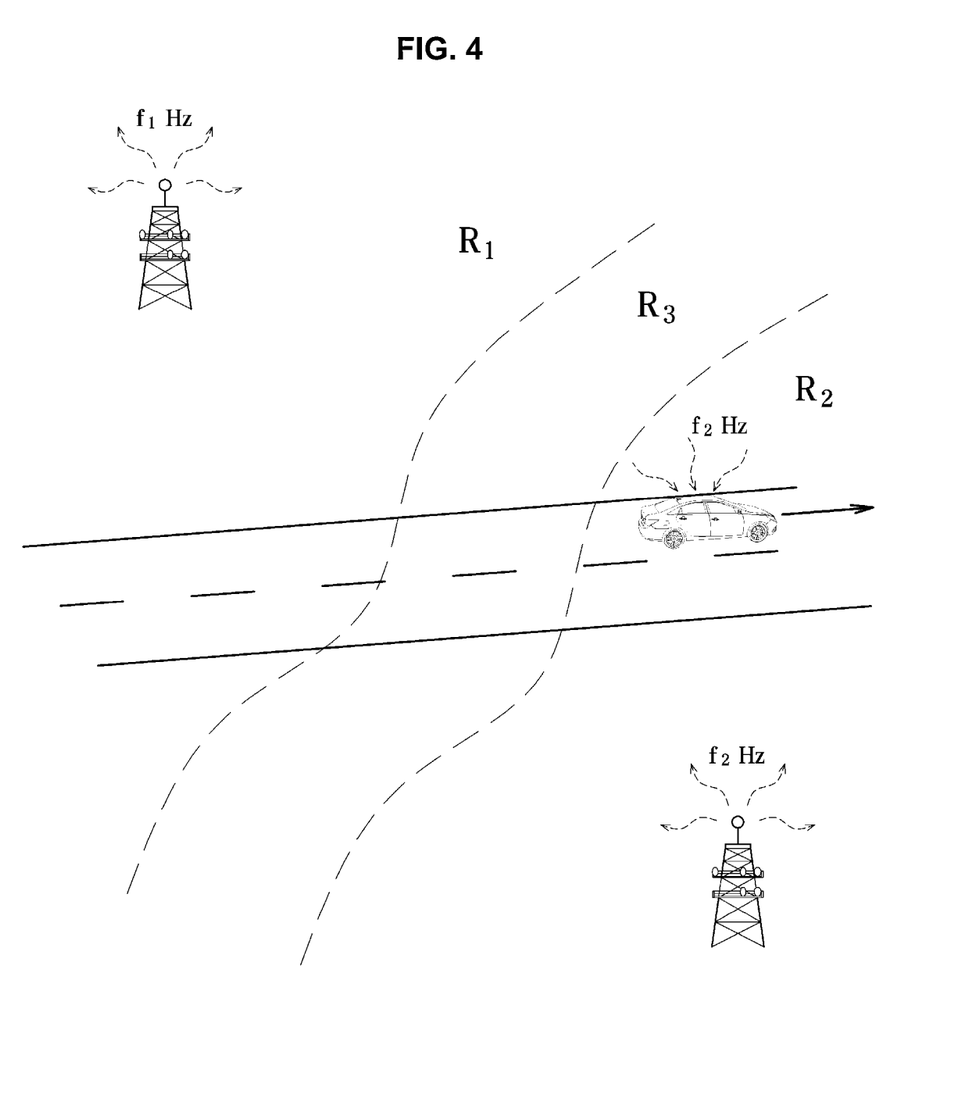
FIG. 4 is a view exemplarily illustrating a vehicle receiving broadcast signals according to another exemplary embodiment of the present disclosure.

FIG. 2 is a view exemplarily illustrating a vehicle receiving the broadcast signal according to an exemplary embodiment of the present disclosure. FIG. 3 is a view exemplarily illustrating a vehicle receiving the broadcast signal according to another exemplary embodiment of the present disclosure. FIG. 4 is a view exemplarily illustrating a vehicle receiving the broadcast signal according to another exemplary embodiment of the present disclosure.

FIGS. 2, 3 and 4, a broadcasting station may transmit a broadcasting signal through base stations (ST1 and ST2).

In the instant case, the frequencies of the broadcast signals transmitted by the base stations (ST1 and ST2) may be different according to regions (e.g., administrative districts). In other words, broadcast signals including the same broadcast content provided to the same broadcasting station may be provided at different frequencies in different regions.

For example, the first broadcast signal including broadcast content provided by a broadcast station A in a first region R1 may be broadcast on a first frequency f1 through a first base station ST1. Furthermore, the second broadcast signal including broadcast content provided by the broadcast station A in a second region R2 may be broadcast on a second frequency f2 through a second base station ST2. In the instant case, the frequency of the first broadcast signal may be different from the frequency of the second broadcast signal. However, the source of the first broadcast signal may be the same as that of the second broadcast signal, and the content of the first broadcast signal may be the same as that of the second broadcast signal.

The AVN device 100 may change the frequency for receiving the broadcast signal provided by the broadcasting station A, depending on the location of the vehicle 1.

The memory 191 may store a table including a plurality of regions and the frequency for receiving the broadcast signal provided by the broadcasting station an in each of the regions. For example, the memory 191 may store a table including the first region R1 and the first frequency f1 corresponding to the first region R1, and the second region R2 and the second frequency f2 corresponding to the second region R2.

Regions may be defined by absolute coordinates including latitude and longitude. In other words, the regions may be defined by a coordinate system corresponding to the location information identified by the GNSS receiver 130. Accordingly, the AVN device 100 may identify a region (e.g., the first region or the second region) in which the vehicle 1 is located based on the location information identified by the GNSS receiver 130.

For example, the user may operate the AVN device to listen to broadcast content provided by the broadcasting station A.

As shown in FIG. 2, when the vehicle 1 is located in the first region R1, the AVN device 100 may receive the first broadcast signal provided by the broadcasting station A through the first frequency f1. Furthermore, as shown in FIG. 3, when the vehicle 1 moves from the first region R1 to the second region R2, the AVN device 100 may receive the second broadcast signal provided by the broadcasting station A through the second frequency.

Accordingly, while the vehicle 1 moves from the first region R1 to the second region R2, the AVN device 100 may change the reception frequency to receive the broadcast content selected by the user by referring to the table in the memory 191 without further manipulation by the user.

At the present time, as shown in FIG. 4, in a third region R3, which is the boundary between the first region R1 and the second region R2, the first broadcast signal broadcasted on the first frequency f1 through the first base station ST1 and the second broadcast signal broadcasted on the second frequency f2 through the second base station ST2 may be mixed with each other. For example, if the distance between the vehicle 1 and the first base station ST1 in the first region R1 is approximately equal to the distance between the vehicle 1 and the second base station ST2 in the second region R2, the intensity of the first broadcast signal of the first frequency f1 may be approximately equal to that of the second broadcast signal of the second frequency f2.

The intensity of the first broadcast signal of the first frequency f1 in the third region R3 may be less than that of the first broadcast signal of the first frequency f1 in the first region R1. Therefore, a signal-to-noise ratio (SNR) of the first broadcast signal of the first frequency f1 in the third region R3 may be less than the SNR of the first broadcast signal of the first frequency f1 in the first region R1. Furthermore, the intensity of the second broadcast signal of the second frequency f2 in the third region R3 may be less than that of the second broadcast signal of the second frequency f2 in the second region R2. Accordingly, the SNR of the second broadcast signal of the second frequency f2 in the third region R3 may be less than the SNR of the second broadcast signal of the second frequency f2 in the second region R2.

As shown in FIG. 4, the AVN device 100 may receive all of the first broadcast signal of the first frequency f1 and the second broadcast signal of the second frequency f2 to improve the SNR of the broadcast signal in the third region R3.

For example, the AVN device 100 may process the first broadcast signal of the first frequency f1 through a first reception path 110a of the broadcast receiver 110, and process the second broadcast signal of the second frequency f2 through a second reception path 120a. While the first broadcast signal passes through the first reception path 110a and the second broadcast signal passes through the second reception path 120a, the broadcast receiver 110 may respectively shift the frequency of the first broadcast signal and the frequency of the second broadcast signal so that the frequency of the first broadcast signal and the frequency of the second broadcast signal become the same. For example, the broadcast receiver 110 may perform frequency synthesis on each of the first broadcast signal and the second broadcast signal so that the frequency of the first broadcast signal is equal to that of the second broadcast signal.

The broadcast receiver 110 may provide both the broadcast signal of the first frequency f1 and the broadcast signal of the second frequency f2 to the processor 190.

The processor 190 may synthesize the first broadcast signal and the second broadcast signal, and process the synthesized broadcast signals.

For example, the first broadcast signal and the second broadcast signal may have the same frequency by frequency synthesis in the broadcast receiver 110. In the instant case, the frequencies of the first and second broadcast signals may be different from the first and second frequencies f1 and f2.

Due to the difference between the path through which the first broadcast signal is transmitted and the path through which the second broadcast signal is transmitted, a phase difference may exist between the first broadcast signal and the second broadcast signal. The processor 190 may delay any one of the first and second broadcast signals to match the phase of the first broadcast signal and the phase of the second broadcast signal.

The processor 190 may synthesize the first and second broadcast signals with the same phase, and demodulate the synthesized broadcast signals. In other words, the processor 190 may obtain broadcast content (e.g., sound or image) from the synthesized broadcast signals.

The processor 190 may provide an electrical signal representing the broadcast content to the display or speaker 30.

Accordingly, when the vehicle 1 is located in a region where the frequency of the broadcast signal is changed, the AVN device 100 may obtain the broadcast signals from a plurality of different frequencies, synthesize the received broadcast signals, and obtain the broadcast content from the synthesized broadcast signals.

Accordingly, in the region where the frequency of the broadcast signal is changed, lowering of the SNR of the broadcast signal may be prevented or suppressed.

Furthermore, the frequency of the broadcast signal received by the AVN device 100 may shift from the first frequency f1 to the second frequency f2 through the first and second frequencies f2. As a result, interruption of broadcast or fluctuation of broadcast may be prevented or suppressed while vehicle 1 passes the boundary of the region.

Figure 5:
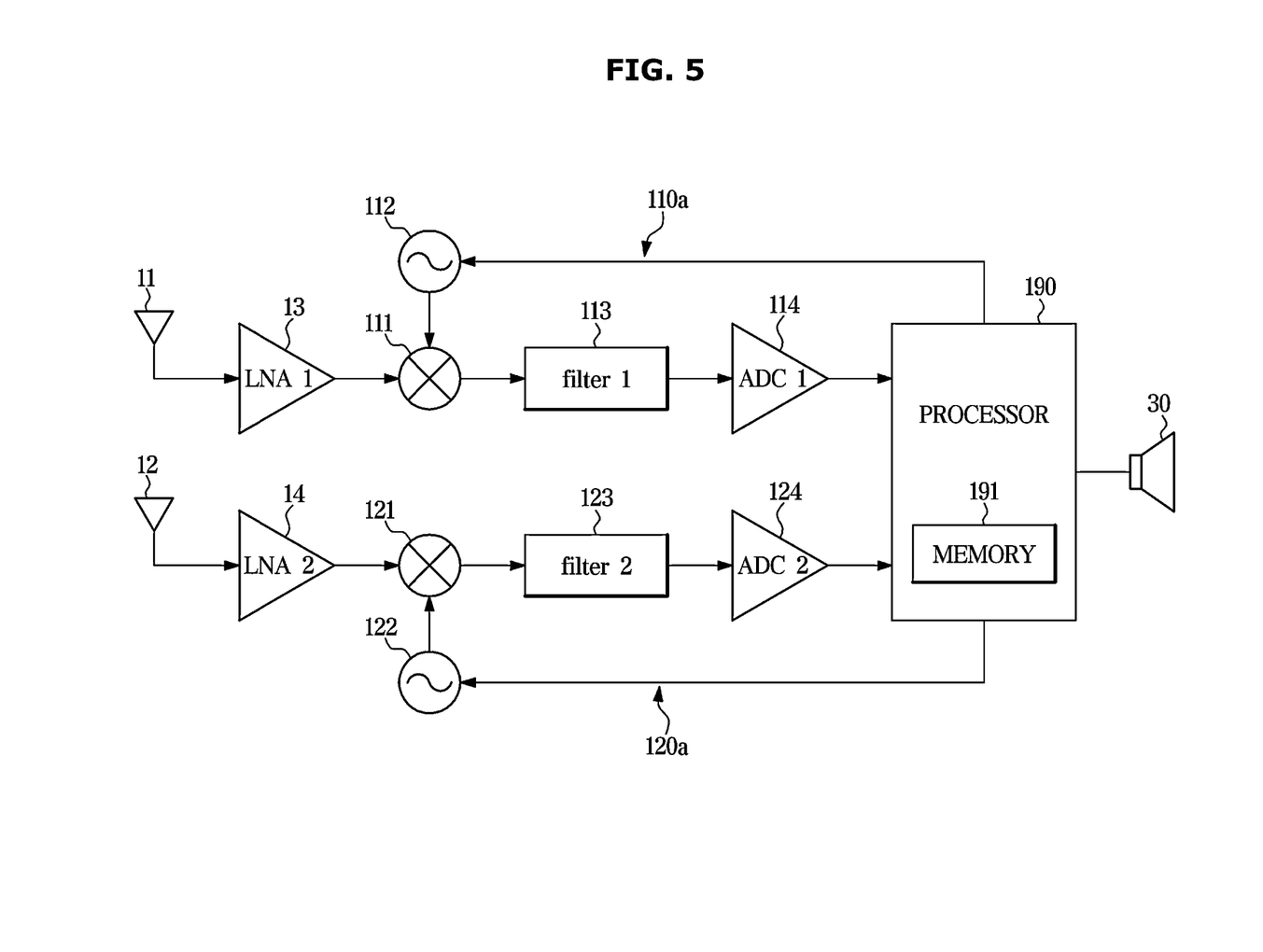
FIG. 5 is a view exemplarily illustrating a broadcast receiver and a processor included in a vehicle according to an exemplary embodiment of the present disclosure.
Figure 6:
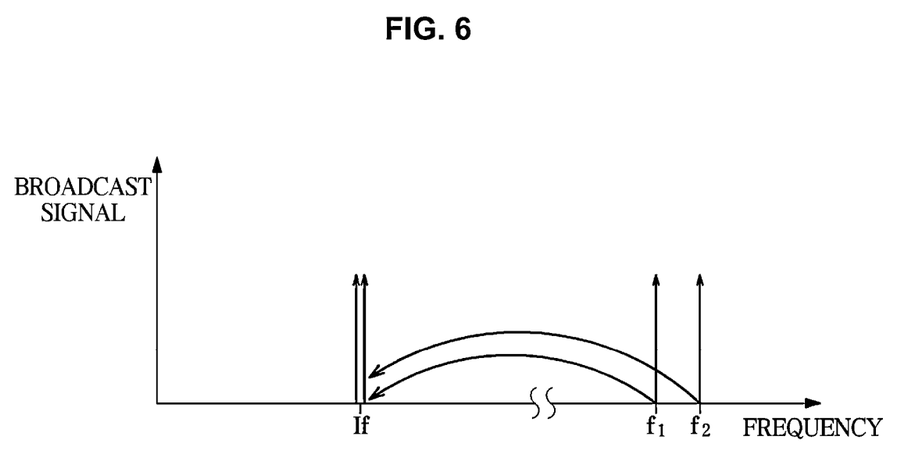
FIG. 6 is a view exemplarily illustrating a frequency shift of broadcast signals by the broadcast receiver shown in FIG. 5.

FIG. 5 is a view exemplarily illustrating the broadcast receiver and a processor included in a vehicle according to an exemplary embodiment of the present disclosure. FIG. 6 is a view exemplarily illustrating a frequency shift of the broadcast signal by the broadcast receiver shown in FIG. 5.

FIG. 5 and FIG. 6, the vehicle 1 may include broadcast reception antenna 10, or the broadcast receiver 110 electrically or mechanically connected to the broadcast reception antenna 10, or the processor 190 connected to the broadcast receiver 110.

The broadcast reception antenna 10 may include the first reception antenna 11 or the second reception antenna 12. The first and second reception antennae 11 and 12 may receive broadcast signals of different frequencies.

The broadcast reception antenna 10 may optionally include a first low noise amplifier (LNA) 13 or a second LNA 14. The first LNA 13 may be electrically connected to the first reception antenna 11, and may amplify a high frequency broadcast signal received by the first reception antenna 11. Furthermore, the second LNA 14 may be electrically connected to the second reception antenna 12, and may amplify a high frequency broadcast signal received by the second reception antenna 12.

The broadcast receiver 110 may include the first reception path 110a or the second reception path 120a. The first reception path 110a may be electrically connected to the first LNA 13, and the second reception path 120a may be electrically connected to the second LNA 14. The broadcast receiver 110 may optionally include the first LNA 13 or the second LNA 14.

The first reception path 110a may include a first frequency synthesizer 111 electrically connected to the first LNA 13, or a first oscillator 112 electrically connected to the first frequency synthesizer 111, or a first filter 113 electrically connected to the first frequency synthesizer 111, or a first analog to digital converter (ADC) 114 electrically connected to the first filter 113.

The first oscillator 112 may output a first reference signal for converting the high frequency broadcast signal received by the first reception antenna 11 into the broadcast signal of an intermediate frequency (IF). The first reference signal may be a sinusoidal that does not include any information.

The first frequency synthesizer 111 may combine the first broadcast signal of the first frequency f1 obtained from the first LNA 13 with the first reference signal obtained from the first oscillator 112. As the first broadcast signal is synthesized with the first reference signal, as shown in FIG. 6, the frequency of the first broadcast signal may be shifted from the first frequency f1 to the IF.

The first filter 113 may pass the first broadcast signal from the signals shifted to the IF and block other signals. The first filter 113 may pass the frequency band including the first broadcast signal and block signals having a frequency except for the corresponding frequency band. For example, the first filter 113 may include a band pass filter (BPF) that passes a signal of a predetermined frequency band blocks signals except for the predetermined frequency band.

The first ADC 114 may convert the first broadcast signal that has passed through the first filter 113 into a digital signal. The first ADC 114 may provide the first broadcast signal converted into the digital signal to the processor 190.

The second reception path 120a may include a second frequency synthesizer 121 electrically connected to the second LNA 14, or a second oscillator 122 electrically connected to the second frequency synthesizer 121, or a second filter 123 electrically connected to the second frequency synthesizer 121, or a second ADC 124 electrically connected to the second filter 123.

The second oscillator 122 may output a second reference signal for converting the high frequency broadcast signal received by the second reception antenna 12 into the broadcast signal of the IF.

The frequency of the second reference signal may be controlled by the processor 190. For example, the second broadcast signal of the second frequency f2 may be converted into the second broadcast signal of the IF by being synthesized with the second reference signal. In other words, the frequency of the frequency-synthesized second broadcast signal may be the same as the frequency of the frequency-synthesized first broadcast signal. Accordingly, the frequency of the second reference signal may be controlled by the processor 190 so that the frequency of the frequency-synthesized second broadcast signal is equal to that of the frequency-synthesized first broadcast signal.

For example, the frequency of the second reference signal may be determined by the following [Equation 1].

$$F_{r2}=F_{r1}-(f_1-f_2)$$ [Equation 1]

Here, Fr2 represents the frequency of the second reference signal, Fr1 represents the frequency of the first reference signal, f1 represents the frequency of the broadcast signal in the first region, and f2 represents the frequency of the broadcast signal in the second region.

Accordingly, the frequency of the second reference signal may be determined based on the frequency of the first reference signal, the frequency of the broadcast signal in the first region R1, and the frequency of the broadcast signal in the second region R2.

The second frequency synthesizer 121 may synthesize the second broadcast signal of the second frequency f2 obtained from the second LNA 14 and the second reference signal obtained from the second oscillator 122. As the second broadcast signal is synthesized with the second reference signal, as shown in FIG. 6, the frequency of the second broadcast signal may be shifted from the second frequency f2 to the IF.

In the instant case, the frequency of the second broadcast signal output from the second frequency synthesizer 121 may be the same as the frequency of the first broadcast signal output from the first frequency synthesizer 111. Both the frequency of the second broadcast signal output from the second frequency synthesizer 121 and the frequency of the first broadcast signal output from the first frequency synthesizer 111 may be the IF.

The second filter 123 may pass the second broadcast signal from the signals shifted to the IF and block other signals. The second filter 123 may include, for example, a band pass filter, and may pass the frequency band including the second broadcast signal and block the signals having a frequency except for the corresponding frequency band.

The pass frequency band of the second filter 123 may be substantially the same as the pass frequency band of the first filter 113.

The second ADC 124 may convert the second broadcast signal that has passed through the second filter 123 into a digital signal. The second ADC 124 may provide the second broadcast signal converted into the digital signal to the processor 190.

The processor 190 may receive the digitized first broadcast signal and/or the digitized second broadcast signal from the first ADC 114 and/or the second ADC 124.

The processor 190 may process the first broadcast signal and/or the second broadcast signal depending on the location of the vehicle 1. For example, the processor 190 may process the first broadcast signal in response to the vehicle 1 being located in the first region R1, and may process the second broadcast signal in response to the vehicle 1 being located in the second region R2. Furthermore, the processor 190, in response to the vehicle 1 being located in the third region R3 which is the boundary between the first region R1 and the second region R2, may synthesize the first broadcast signal and the second broadcast signal and process the synthesized broadcast signals.

The processor 190 may amplify the broadcast signal, or attenuate noise of the broadcast signal, or demodulate the broadcast signal. The processor 190 may convert the demodulated broadcast signal into an analog signal and provide the analogized broadcast signal to the speaker 30.

Accordingly, the AVN device 100 may shift the first frequency f1 of the first broadcast signal and the second frequency f2 of the second broadcast signal to the same one IF, and synthesize the first broadcast signal and the second broadcast signal at the IF.

Therefore, interruption of broadcast or fluctuation of broadcast may be prevented or suppressed while vehicle 1 is passing through the boundary of a region.

Figure 7:
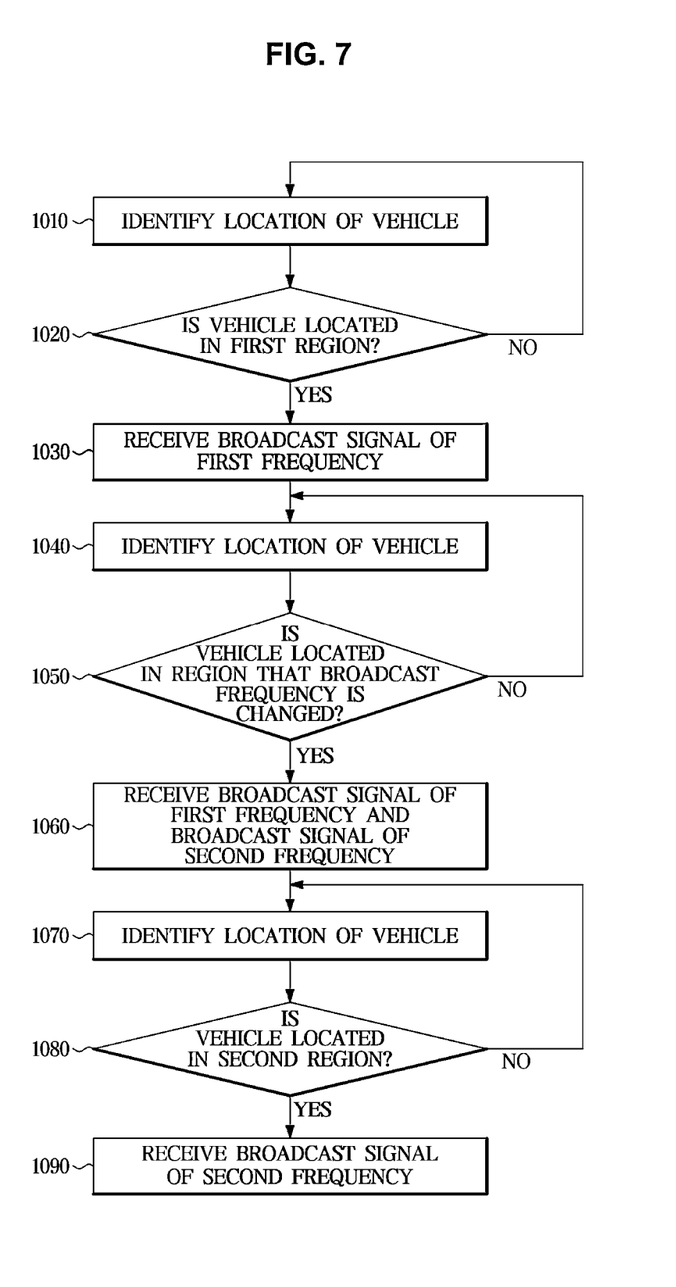
FIG. 7 is a view exemplarily illustrating an operation of receiving broadcast signals of a vehicle according to an exemplary embodiment of the present disclosure.

FIG. 7 is a view exemplarily illustrating an operation of receiving the broadcast signal of a vehicle according to an exemplary embodiment of the present disclosure.

The AVN device 100 may identify the location of the vehicle 1 (in operation 1010).

The GNSS receiver 130 may obtain the GNSS signal, and may identify the location of the vehicle 1 based on the GNSS signal. The GNSS receiver 130 may provide information on the location of the identified vehicle 1 to the processor 190.

The AVN device 100 may identify whether the location of the vehicle 1 is within the first region R1 or not (in operation 1020).

The processor 190 compares the location (e.g., latitude and longitude) of the vehicle 1 with a location range (e.g., a range of latitude and longitude) of the first region R1, and may identify whether the vehicle 1 is located within the first region R1 or not.

When the location of the vehicle 1 is within the first region R1 (Yes in operation 1020), the AVN device 100 may receive the broadcast signal of the first frequency f1 (in operation 1030).

The processor 190 may receive the first broadcast signal having the first frequency f1 corresponding to the first region R1. The processor 190 may shift the frequency of the first broadcast signal to the IF and demodulate the first broadcast signal of the IF. The processor 190 may provide the demodulated first broadcast signal to the speaker 30.

The AVN device 100 may re-identify the location of the vehicle 1 (in operation 1040).

Operation 1040 may be the same as operation 1010.

The AVN device 100 may identify whether the location of the vehicle 1 is within the third region R3 in which the broadcast frequency is changed (in operation 1050).

The processor 190 compares the location (e.g., latitude and longitude) of the vehicle 1 with a location range (e.g., the range of latitude and longitude) of the third region R3, and may identify whether the vehicle 1 is located within the third region R3 or not.

In response to the location of the vehicle 1 being within the third region R3 (YES in operation 1050), the AVN device 100 may receive both the broadcast signal of the first frequency f1 and the broadcast signal of the second frequency f2 (in operation 1060).

The processor 190 may receive the first broadcast signal having the first frequency f1 and the second broadcast signal having the second frequency f2 corresponding to the first region R1. The processor 190 may shift both the frequency of the first broadcast signal and the frequency of the second broadcast signal to the IF, and synthesize the first broadcast signal of the IF with the second broadcast signal of the IF. The processor 190 may delay the first broadcast signal or the second broadcast signal based on the difference between the phase of the first broadcast signal and the phase of the second broadcast signal. The processor 190 may demodulate the synthesized broadcast signal and provide the demodulated broadcast signal to the speaker 30.

The AVN device 100 may re-identify the location of the vehicle 1 (in operation 1070).

Operation 1070 may be the same as operation 1010.

The AVN device 100 may identify whether the location of the vehicle 1 is within the second region R2 (in operation 1080).

The processor 190 compares the location (e.g., latitude and longitude) of the vehicle 1 with a location range (e.g., the range of latitude and longitude) of the second region R2, and may identify whether the vehicle 1 is located within the second region R2 or not.

In response to the location of the vehicle 1 being within the second region R2 (YES in operation 1090), the AVN device 100 may receive the broadcast signal of the second frequency f2 (in operation 1090).

The processor 190 may receive the first broadcast signal having the second frequency f2 corresponding to the second region R2. The processor 190 may shift the frequency of the second broadcast signal to the IF and demodulate the second broadcast signal of the IF. The processor 190 may provide the demodulated second broadcast signal to the speaker 30.

As is apparent from the above, according to the exemplary embodiments of the present disclosure may provide the vehicle configured for automatically changing the reception frequency depending on the location of the vehicle and the method of controlling the same.

Furthermore, according to the exemplary embodiments of the present disclosure may provide the vehicle for receiving the plurality of broadcast signals that have different frequencies but the same broadcast content depending on the location of the vehicle, and the method of controlling the same.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. Furthermore, the components and modules may be implemented so that they execute one or more CPUs in a device.

With that being said, and in addition to the above described exemplary embodiments of the present disclosure, embodiments can thus be implemented through computer readable code/instructions in/on a medium, e.g., a computer readable medium, to control at least one processing element to implement any above described exemplary embodiment of the present disclosure. The medium can correspond to any medium/media permitting the storing and/or transmission of the computer readable code.

The computer-readable code may be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still furthermore, as only an example, the processing element could include at least one processor or at least one computer processor, and processing elements may be distributed and/or included in a single device.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle, comprising:
   a plurality of broadcast reception antennae;
   a speaker; and
   an audio-video-navigation (AVN) device electrically connected to the plurality of broadcast reception antennae and the speaker;
   wherein the AVN device is configured to:
      receive broadcast signals of a plurality of different frequencies from the plurality of broadcast reception antennae,
      synthesize the broadcast signals of the plurality of different frequencies, and
      provide the synthesized broadcast signal to the speaker to output a sound corresponding to the synthesized broadcast signals, and
   wherein the AVN device is further configured to:
      shift a frequency of a first broadcast signal to an intermediate frequency (IF),
      shift a frequency of a second broadcast signal to the IF, and synthesize the first broadcast signal of the IF and the second broadcast signal of the IF.

2. The vehicle of claim 1, further including:
a Global Navigation Satellite System (GNSS) antenna,
wherein the AVN device is electrically connected to the GNSS antenna, and
wherein the AVN device is further configured to:
identify a location of the vehicle based on a signal received through the GNSS antenna,
process at least one of the broadcast signals of the plurality of different frequencies based on the location of the vehicle, and
provide the processed broadcast signal to the speaker.

3. The vehicle of claim 2, wherein the AVN device is further configured to:
process the first broadcast signal of a first frequency among the broadcast signals of the plurality of different frequencies based on the vehicle being located in a first region, and
process the second broadcast signal of a second frequency among the broadcast signals of the plurality of different frequencies based on the vehicle being located in a second region.

4. The vehicle of claim 3, wherein the AVN device is further configured to synthesize the first broadcast signal of the first frequency and the second broadcast signal of the second frequency based on the vehicle being located in a third region of a boundary between the first region and the second region.

5. The vehicle of claim 1, wherein the AVN device is further configured to:
delay a phase of at least one of the first broadcast signal and the second broadcast signal based on a difference between a phase of the first broadcast signal of the IF and a phase of the second broadcast signal of the IF.

6. The vehicle of claim 1, wherein the AVN device is further configured to:
shift the frequency of the first broadcast signal to the IF by synthesizing a first reference signal and the first broadcast signal, and
shift the frequency of the second broadcast signal to the IF by synthesizing a second reference signal and the second broadcast signal.

7. The vehicle of claim 6, wherein the AVN device is further configured to identify a frequency of the second reference signal based on a frequency of the first reference signal, the first frequency, and the second frequency.

8. A method of controlling a vehicle, the method comprising steps of:
receiving a plurality of broadcast signals of a plurality of different frequencies from a plurality of broadcast reception antennae of the vehicle;
synthesizing the broadcast signals of the plurality of different frequencies; and
outputting a sound corresponding to the synthesized broadcast signals,
wherein the synthesizing comprises:
shifting a frequency of a first broadcast signal to an intermediate frequency (IF),
shifting a frequency of a second broadcast signal to the IF, and
synthesizing the first broadcast signal of the IF and the second broadcast signal of the IF.

9. The method of claim 8, further including:
identifying a location of the vehicle based on a signal received through a Global Navigation Satellite System (GNSS) antenna of the vehicle, and
processing at least one of the broadcast signals of the plurality of different frequencies based on the location of the vehicle.

10. The method of claim 9, wherein the processing at least one of the broadcast signals of the plurality of different frequencies based on the location of the vehicle includes:
processing the first broadcast signal of a first frequency among the broadcast signals of the plurality of different frequencies based on the vehicle being located in a first region, and
processing the second broadcast signal of a second frequency among the broadcast signals of the plurality of different frequencies based on the vehicle being located in a second region.

11. The method of claim 10, wherein the processing at least one of the broadcast signals of the plurality of different frequencies based on the location of the vehicle further includes:
synthesizing the first broadcast signal of the first frequency and the second broadcast signal of the second frequency based on the vehicle being located in a third region of a boundary between the first region and the second region.

12. The method of claim 8, wherein the synthesizing of the first and second broadcast signals of the IF includes:
delaying a phase of at least one of the first broadcast signal and the second broadcast signal based on a difference between a phase of the first broadcast signal of the IF and a phase of the second broadcast signal of the IF.

13. The method of claim 8,
wherein the shifting of the frequency of the first broadcast signal to the IF includes synthesizing a first reference signal and the first broadcast signal, and
wherein the shifting of the frequency of the second broadcast signal to the IF includes synthesizing a second reference signal and the second broadcast signal.

14. The method of claim 13, wherein a frequency of the second reference signal is based on a frequency of the first reference signal, the first frequency, and the second frequency.

15. An audio video navigation (AVN) device provided in a vehicle, the AVN device comprising:
a broadcast receiver configured to obtain a plurality of broadcast signals of different frequencies from a plurality of broadcast reception antennae of the vehicle; and
a processor configured to synthesize the broadcast signals of the plurality of different frequencies and provide a speaker of the vehicle to output a sound corresponding to the synthesized broadcast signals,
wherein the broadcast receiver comprises:
a first frequency synthesizer configured to shift a frequency of a first broadcast signal to an intermediate frequency (IF); and
a second frequency synthesizer configured to shift a frequency of a second broadcast signal to the IF, and
wherein the processor synthesizes the first broadcast signal of the IF and the second broadcast signal of the IF.

16. The AVN device of claim 15, further including:
a Global Navigation Satellite System (GNSS) receiver configured to identify a location of the vehicle based on a signal received through a GNSS antenna of the vehicle, wherein the processor is further configured to:
  process at least one of the broadcast signals of the plurality of different frequencies based on the location of the vehicle, and
  provide the processed broadcast signal to the speaker.

17. The AVN device of claim 16, wherein the processor is further configured to:
  process the first broadcast signal of a first frequency among the broadcast signals of the plurality of different frequencies based on the vehicle being located in a first region, and
  process the second broadcast signal of a second frequency among the broadcast signals of the plurality of different frequencies based on the vehicle being located in a second region.

18. The AVN device of claim 17, wherein the processor is further configured to synthesize the first broadcast signal of the first frequency and the second broadcast signal of the second frequency, based on the vehicle being located in a third region of a boundary between the first region and the second region.

* * * * *